United States Patent [19]
Bianco

[11] Patent Number: 5,550,929
[45] Date of Patent: Aug. 27, 1996

[54] MEANS AND METHOD FOR READING INDICIA ON A SKEWED SUBSTRATE

[76] Inventor: James S. Bianco, 217 Brainard Rd., Enfield, Conn. 06082

[21] Appl. No.: 842,011

[22] Filed: Feb. 26, 1992

[51] Int. Cl.⁶ .................................................. G06K 9/00
[52] U.S. Cl. ............................................................ 382/135
[58] Field of Search ................................ 382/1, 9, 7, 12, 382/11, 30, 34, 48, 100, 135, 173, 182, 183, 209, 218, 282; 235/462; 356/71; 902/6; G06K 9/00, 9/34, 9/18, 9/62, 9/68, 9/20, 7/10, 9/74; H04N 7/18

[56] References Cited

U.S. PATENT DOCUMENTS

| | | | |
|---|---|---|---|
| 3,832,686 | 8/1974 | Bilgutay | 235/462 |
| 3,852,573 | 12/1974 | Dolch | 235/462 |
| 4,053,737 | 10/1977 | Lafevers et al. | 235/462 |
| 5,077,805 | 12/1991 | Tan | 382/135 |
| 5,199,543 | 4/1993 | Kamagami et al. | 382/135 |

*Primary Examiner*—Jose L. Couso
*Attorney, Agent, or Firm*—John H. Crozier

[57] ABSTRACT

In one preferred embodiment, a method of reading indicia disposed on a substrate moving relative to a reader, the indicia being parallel to and at a known fixed distance from a linear portion of the substrate, and the indicia normally moving relative to the reader along a fixed plane which passes through the reader, the method including; optically sensing the position of the linear portion relative to the reader; and in response to optically sensing the position of the linear portion, adjusting the reader such that the reader can read the indicia when the linear portion is skewed with respect to the reader such that the indicia no longer move along the plane. In a further embodiment, there is provided a method of preventing fluttering of a thin substrate, having upper and lower surfaces and having indicia thereon, as the substrate moves past indicia a reader with the lower surface moving over a base member spaced from the reader, the method including: directing a stream of gas against the upper surface of the substrate so as to force the lower surface of the substrate against the base member so as to maintain the substrate at a fixed distance from the reader.

16 Claims, 5 Drawing Sheets

5,550,929

MEANS AND METHOD FOR READING INDICIA ON A SKEWED SUBSTRATE

BACKGROUND OF THE INVENTION

1. Field of the Invention

The present invention relates to indicia generally and especially to machine readable coded indicia, and more particularly, but not by way of limitation, to novel means and method for reading bar codes on substrates that may be skewed with respect to the means for reading the bar codes. More generally, the present invention relates to sensing the relationship of an edge of the substrate to the reading means.

2. Background Art

A need exists for being able to rapidly and accurately read indicia, such as bar codes, on substrates passing moving relative to a fixed reading head which substrates may be skewed with respect to the reading head so that the bar codes are also skewed with respect to the reading head. Such skewing may result in a portion or all or the bar code not being read.

One environment in which such a need exists is in the dispensing of travelers checks from automatic teller machines (ATMs). It is desirable to read identifying bar codes disposed on such checks as the checks are dispensed from the ATM. Such checks are dispensed quite rapidly and, being of fairly light weight and being mechanically handled in the ATM, they can easily become skewed with respect to a fixed bar code reading head in the ATM.

A further problem in such an environment is that the travelers checks may flutter as they pass the bar code reading head, which fluttering affects the focal point of the reading device.

An additional problem with such reading bar codes on travelers checks is in the physical size of bar code reading equipment that can be retrofitted to existing ATMs. Because of space limitations, conventional scanning bar code reading equipment cannot be easily employed. Also, scanning types of bar code reading equipment are relatively expensive.

Another problem related to size and configuration is that the bar codes on travelers checks are desirably of the invisible or nearly invisible type which require backlighting in the reading thereof. Backlighting cannot practicably be employed with conventional scanning techniques because, typically, the illuminating source moves with the light detector, a near impossibility within the space limitations of an ATM.

Accordingly, it is a principal object of the present invention to provide means and method for reading indicia printed on a substrate, which substrate may be skewed with respect to indicia reading means.

It is a further object of the invention to provide such means and method that permit rapid reading of such indicia.

It is an additional object of the invention to provide such means that can be easily retrofitted to existing ATMs.

It is another object of the invention to provide such means and method that can be employed to read invisible or nearly invisible indicia that require backlighting for the reading thereof.

It is yet a further object of the invention to provide such means and method that can prevent the fluttering of travelers checks as the bar codes thereon are read.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, a method of reading indicia disposed on a substrate moving relative to reading means, said indicia being parallel to and at a known fixed distance from a linear portion of said substrate, and said indicia normally moving relative to said reading means along a fixed plane which passes through said reading means, said method comprising; optically sensing the position of said linear portion relative to said reading means; and in response to said optically sensing said position of said linear portion, adjusting said reading means such that said reading means can read said indicia when said linear portion is skewed with respect to said reading means such that said indicia no longer move along said plane. In a further embodiment, there is provided a method of preventing fluttering of a thin substrate, having upper and lower surfaces and having indicia thereon, as said substrate moves past indicia reading means with said lower surface moving over a base member spaced from said reading means, said method comprising: directing a stream of gas against said upper surface of said substrate so as to force said lower surface of said substrate against said base member so as to maintain said substrate at a fixed distance from said reading means.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
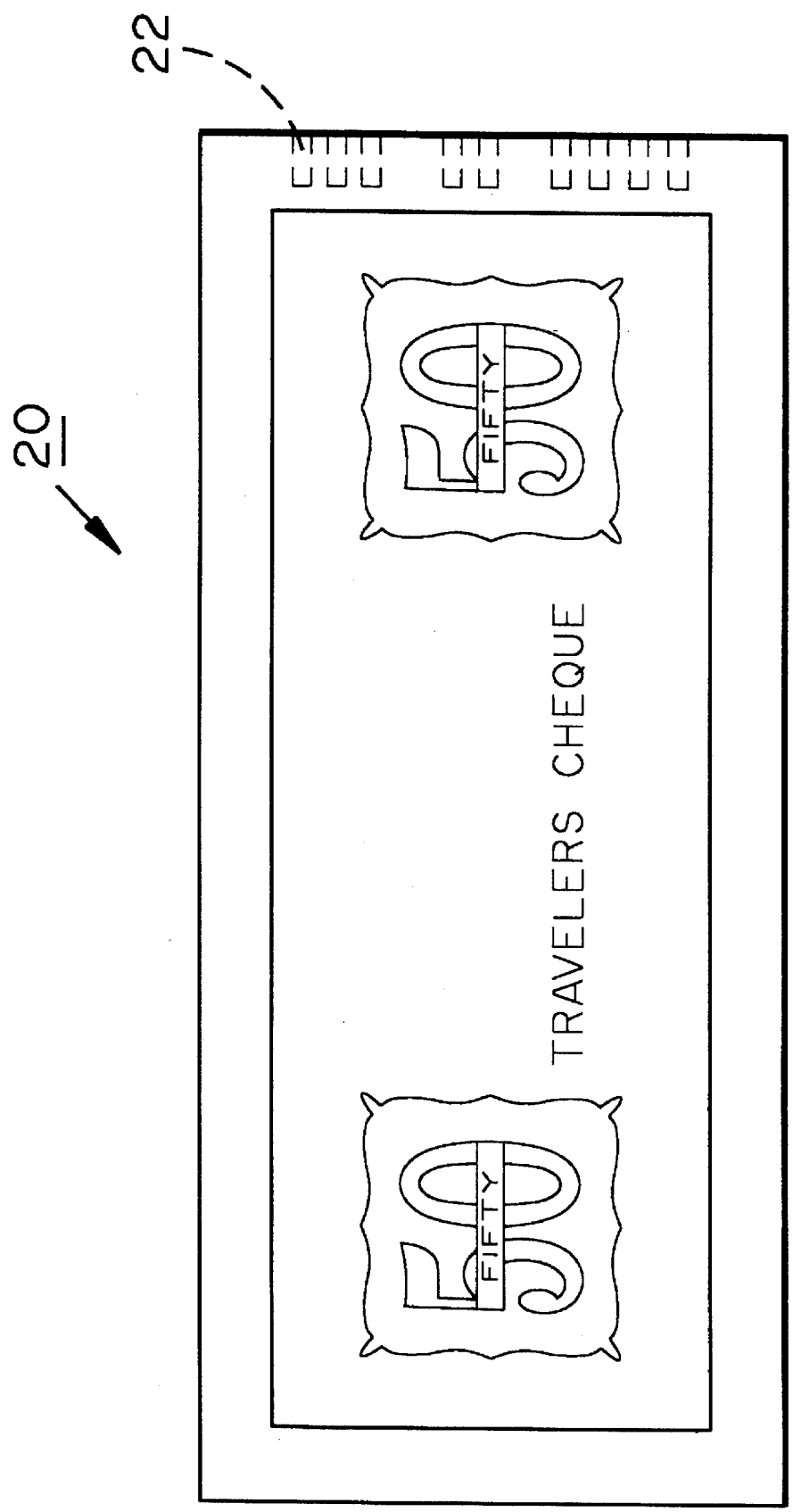
FIG. 1 is a top plan view of a travelers check on which is disposed a bar code which may be read according to the present invention.

Reference should now be made to the Drawing, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a travelers check, generally indicated by the reference numeral 20, on which there is disposed a bar code 22 along one edge thereof. Bar code 22 is shown in broken lines to indicate that it may be of the type which is invisible or which is of low visibility, as is described in U.S. application Ser. No. 07/787,070, filed Nov. 4, 1991, by James S. Bianco, and titled INVISIBLE CODED INDICIA SYSTEM, the disclosure of which is made a part hereof by reference hereinto; although, the present invention is not limited to reading such a bar code and the bar code may be of a conventional type.

Figure 2:
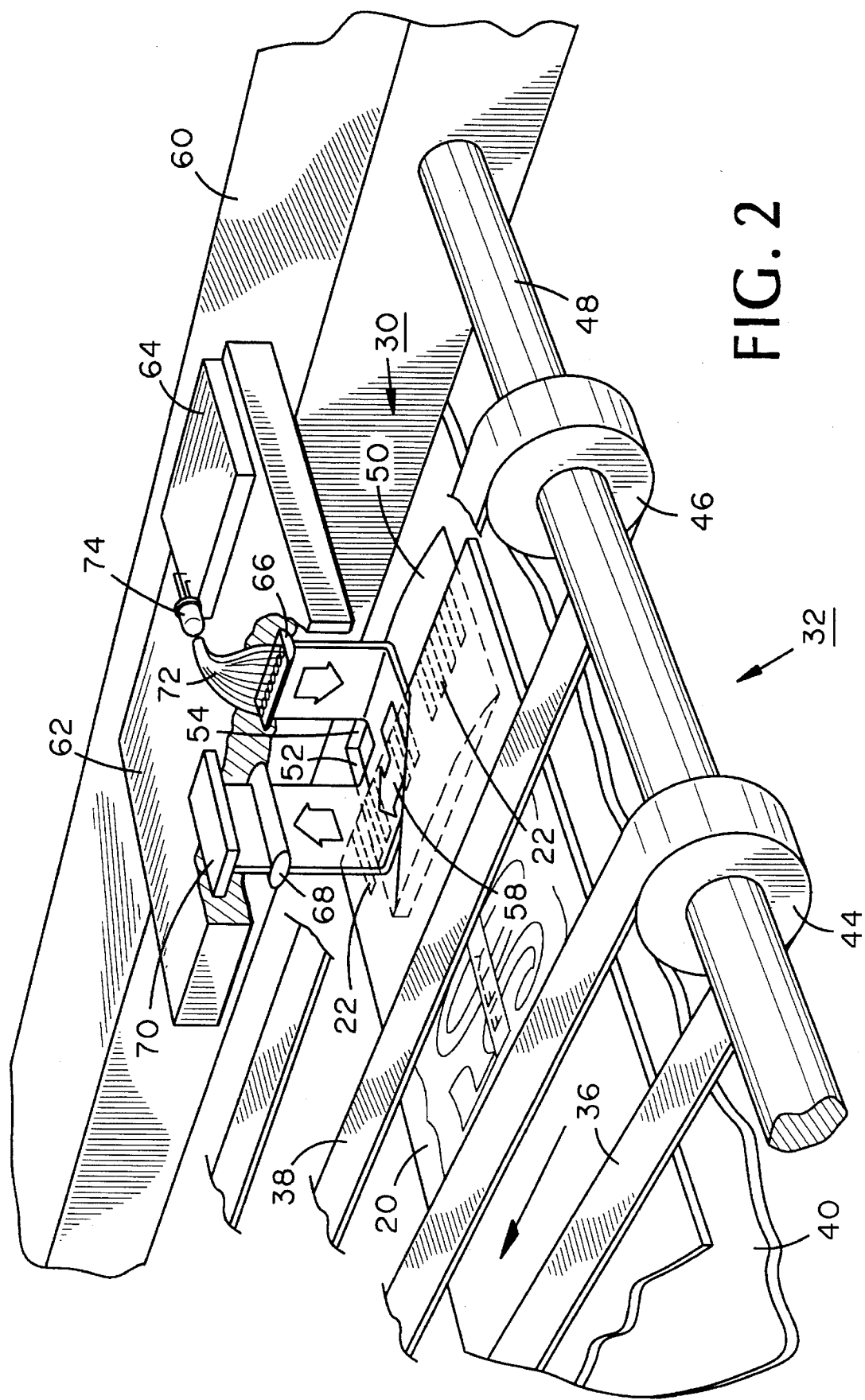
FIG. 2 is a fragmentary perspective view, partially cutaway and partially schematic, of an automatic teller machine including a bar code reading apparatus according to the present invention.

FIG. 2 illustrates an apparatus for reading bar code 22, generally indicated by the reference numeral 30, mounted in a conventional automatic teller machine (ATM), generally indicated by the reference numeral 32. Machine 32 includes moving continuous belts 36 and 38 to which travelers check 20 is loosely adhered as it is moved (in the direction indicated by the narrow arrow) between the belts and a platen 40. Belts 36 and 38 are moved by means of two pulley wheels 44 and 46, respectfully, rotated by a driven shaft 48. It will be understood that travelers check 20 has been removed from a supply drawer (not shown) and is being transported to an exit port (not shown) in the ATM.

In order to clearly show the arrangement of the present invention, travelers check 20 is shown as being transparent to better show the elements of the invention; although, in the usual case, the travelers check would be somewhat opaque.

Figure 3:
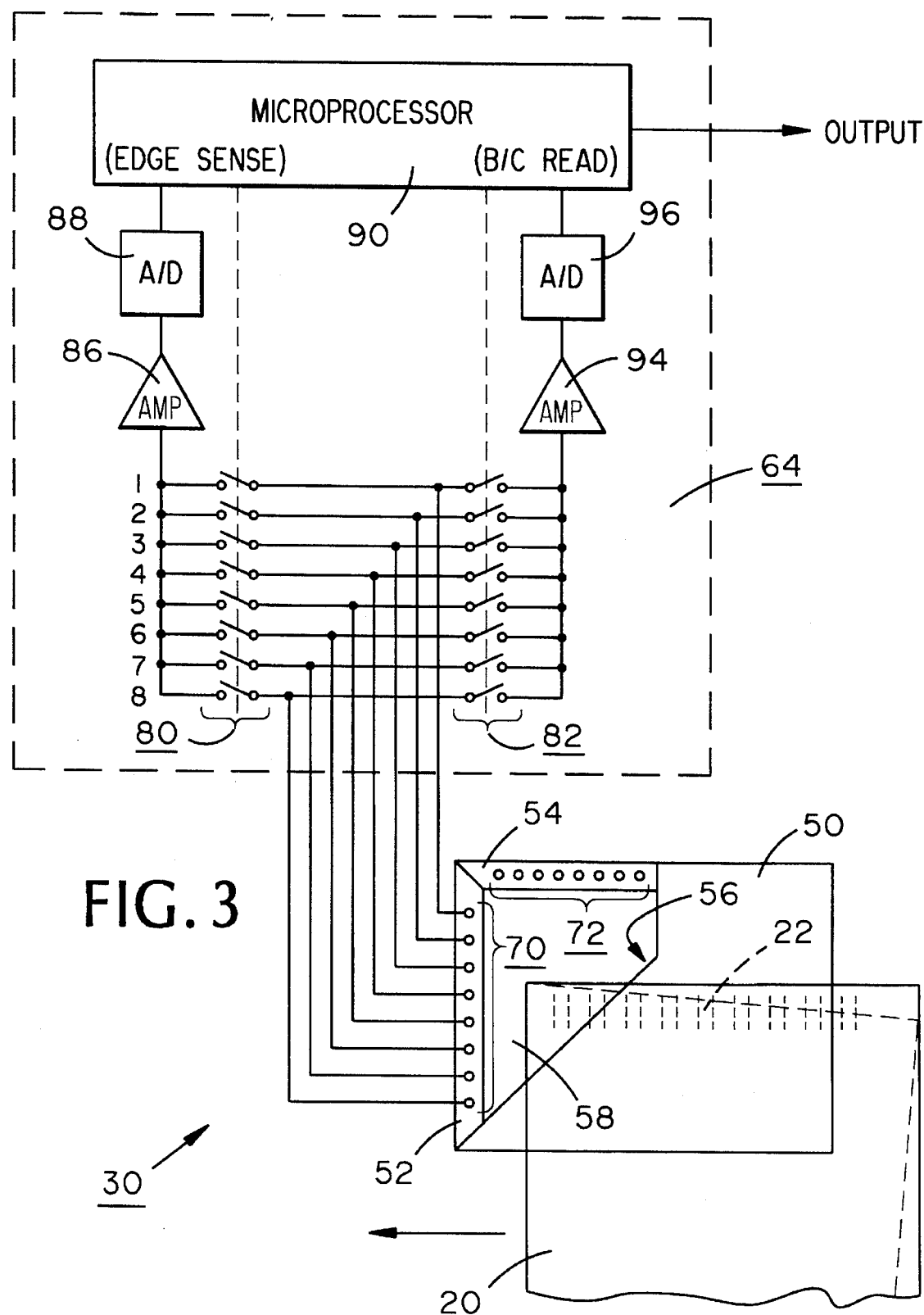
FIG. 3 is a top plan cross-sectional view of a portion of the apparatus of FIG. 2, including a schematic diagram of the reading and control circuitry thereof.

Apparatus 30 includes a partially wedge-shaped base member 50 in which are disposed two mirror surfaces 52 and 54, which are at approximately a 45-degree angle to the vertical, and a vertical mirror surface 56 (FIG. 3 only). Mirror surfaces 52, 54, and 56 are formed as silvered edges of a single piece of glass 58 the upper surface of which is essentially flush with the upper surface of base member 50, or slightly below the upper surface of the base member to protect travelers check 20. Base member 50 is mounted on platen 40 such that travelers check 20 will pass over the base member. Mounted to an interior surface 60 of ATM 32, by any conventional means such as with an adhesive, is an upper support member 62 on which may be mounted control circuitry 64. Also, mounted on upper support member 62 are a first lens 66, a second lens 68, and a linear photodetector array 70. One end of a fiber optic bundle 72 (in this case having eight fibers) is disposed so as to receive light from a light source 74 and the other end of the bundle terminates at first lens 66.

In operation, a light path from first lens 66 to photodetector array 70 is indicated by the broad arrows. Specifically, first lens 66 receives light from light source 74 through fiber optic bundle 72 and focuses it directly downward in eight light beams. The eight light beams are reflected horizontally by mirror surface 54 to mirror surface 56 (FIG. 3), horizontally by mirror surface 56 to mirror surface 54, and vertically upward by mirror surface 54 through travelers check 20 (if present) to photodetector 70. Photodetector 70 is operatively connected to control circuitry 64.

Thus, apparatus 30 is able to provide backlighting to travelers check 20 without having to make any modifications to platen 40.

Referring now primarily to FIG. 3, the means by which bar code 22 is read is illustrated. Circuitry 64 includes first and second switch arrays 80 and 82, respectively, each having a plurality of switches (in this case, eight) which may be FETs, one switch in each of first and second switch arrays being connected to one of the photodetectors comprising photodetector array 70. The numbers "1" through "8" placed alongside first switch array 80 are intended to identify those switches in that array as well as the corresponding switches in switch array 82 and the corresponding photodetectors in photodetector array 70. First switch array 80 provides an input to a low-gain amplifier 86 which is connected to an analog-to-digital converter 88 which provides an input to a edge sensing section of microprocessor 90. In a similar manner, second switch array 82 provides an input to a high-gain amplifier 94 which is connected to an analog-to-digital converter 96 which also provides an input to a bar code reading section of microprocessor 90. Microprocessor 90 may be connected to provide an output to a memory, and/or a display, and/or other conventional components (none shown). Microprocessor 90 is connected to control the opening and closing of the individual switches comprising first and second switch arrays 80 and 82.

Although eight elements are shown for switch arrays 80 and 82 and photodetector array 70, it will be understood that the present invention is not so limited and a greater or lesser number of those elements may be provided; however, the greater the number of those elements, the greater will be the resolution provided by apparatus 30.

As described above with reference to FIG. 2, light passes through fiber optic bundle 72, is focussed by first lens 66 (not shown on FIG. 3), is reflected in turn by mirror surfaces 54 and 56 and then is reflected by mirror surface 52 to photodetector array 70 through travelers check 20 and lens 68 (not shown on FIG. 3), if the travelers check is in the latter, final light path.

Figure 4:
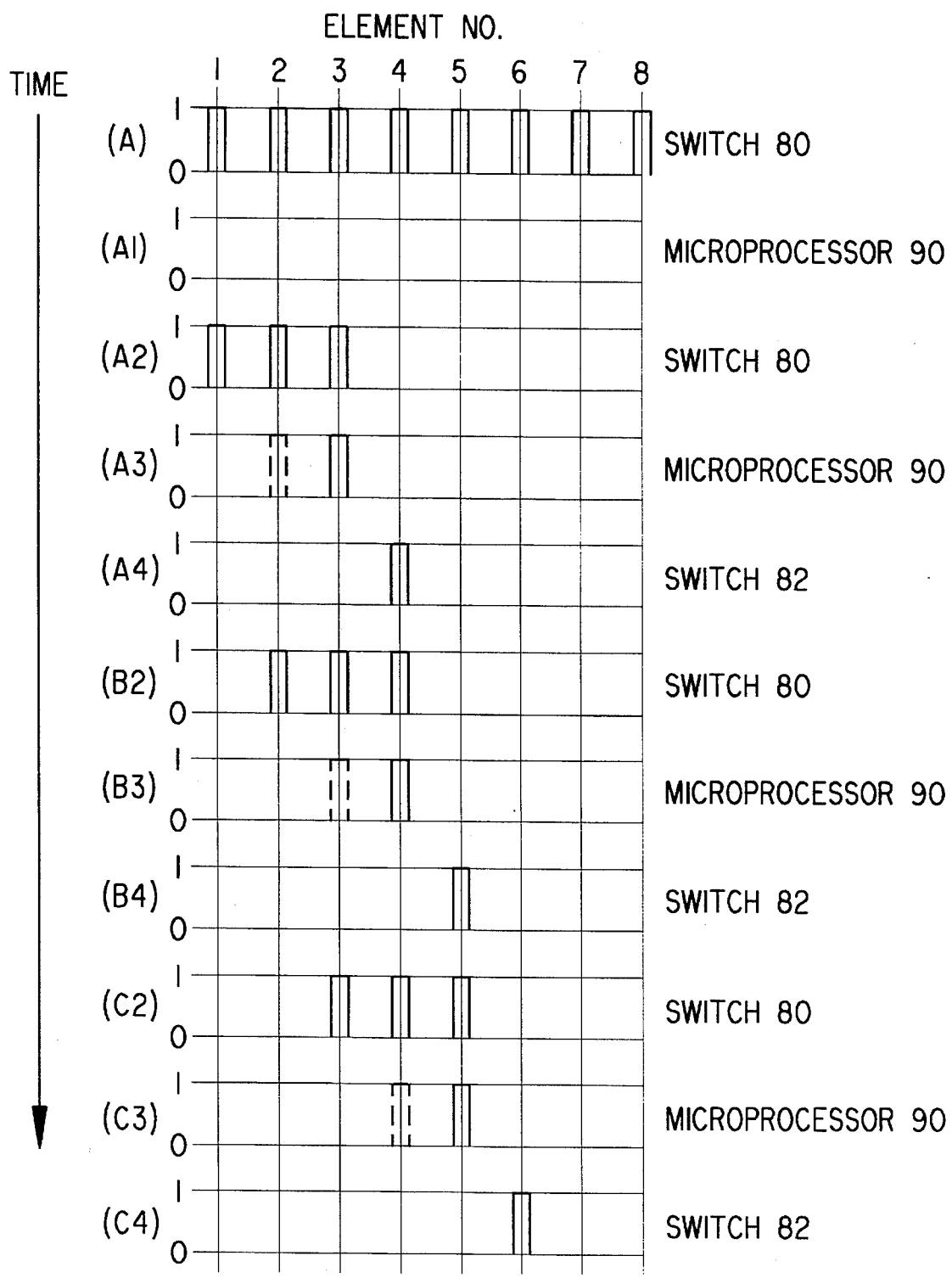
FIG. 4 is a schematic representation of the operation of the reading elements of the apparatus of FIGS. 2 and 3.

Reference now should also be made to FIG. 4 to aid in understanding the operation of the present invention. It should be noted that the rows marked "(A)" through "(C4)" on FIG. 4 do not represent streams of data bits, but indicate inputs, outputs, and/or conditions of the numbered elements at the top of the figure during a period of time. Row (A) indicates an initial period of time, while the lower rows indicate increasingly later periods of time.

As is shown on FIG. 3, travelers check 20 has not yet reached the point where a portion of it will intersect the final light path between mirror surface 52 and photodetector array 70. With travelers check 20 not intersecting the final light path, microprocessor 90 sequentially and repeatingly closes all switches in switch array 80 to continually scan photodetectors numbers 1–8, as is indicated by row (A) on FIG. 4. Since photodetectors numbers 1–8 are all receiving light from light source 74 (FIGS. 2 and 3), the output of each photodetector will be zero and the inputs to microprocessor 90 will all be zero, as indicated by row (A1) on FIG. 4.

As is evident from FIG. 3, when travelers check 20 moves in the direction of the arrow and reaches the final light path, the edge of the travelers check will move between photodetectors numbers 2 and 3, but will be closer to photodetector number 2. As soon as microprocessor 90 receives a positive input from any one of photodetectors numbers 1–8, it stops scanning numbers 4–8 and sequentially and repeatingly closes switches numbers 1–3 to scan only photodetectors numbers 1–3, as is indicated by row (A2) on FIG. 4. Now, the outputs of the latter photodetectors and the inputs to microprocessor 90 will be as indicated by row (A3) on FIG. 4(B). It can be seen that photoelectric number 1 still has a zero output, photodetector number 3 has a full output, and the output of photodetector number 2 is shown as being full, but in dashed lines. Because of the proximity of the edge of travelers check 20 to the light beam to the latter photodetector, the latter photodetector may be switching on and off.

The procedure for reading bar code 22 will now be described. The center of bar code 22 is printed a known distance from the edge of travelers check 20, in this case approximately twice the distance between photodetectors in photodetector array 70. Since the edge of travelers check 20 has been determined to be close to light path number 2, microprocessor 90 closes switch number 4 in second switch array 82, as indicated by row (A4) on FIG. 4. Photodetector array 70 element number 4 is then used to detect the bar code in a conventional manner and provide an input to microprocessor 90.

Provided that travelers check 20 remains in the orientation shown in solid lines and FIG. 3, the edge of the travelers check will continue to move along a fist vertical plane orthogonal to photodetector array 70 and bar code 22 will similarly continue to move along a second vertical plane orthogonal to the photodetector array.

Assume, now, that travelers check 20 becomes skewed with respect to photodetector array 70, such that the travelers check is rotated clockwise from the position shown in solid lines on FIG. 3 to that shown in broken lines (bar code on skewed check omitted for clarity). In this case, the edge of travelers check 20 has moved downward on FIG. 3, with respect to photodetector array 70 and the edge of the travelers check has moved out the plane orthogonal to the photodetector array.

As soon as the input to microprocessor 90 from photodetector array 70 element number 3 starts to become unstable because of the approach thereto of the edge of travelers check 20, the microprocessor stops closing switch number 1 in first switch array 80. Microprocessor 90 then successively and repeatingly closes switches numbers 2–4 in first switch array 80 to scan photodetectors 2–4 in photodetector array 70, as is indicated by row (B2) on FIG. 4. The outputs from the latter photodetectors and the inputs to microprocessor 90 are then as indicated by row (B3) on FIG. 4. At the same time, since bar code 22 has moved in the same relative direction as the edge of travelers check 20, microprocessor 90 opens switch number 4 in second switch array 82 and closes switch number 5, as is indicated by row (B4) on FIG. 4, to receive bar code reading data therethrough.

In a similar manner, further such movement of the edge of travelers check 20 in the same direction will result in microprocessor 90 successively closing switches numbers 3–5 in switch array 80, as is indicated by row (C2) on FIG. 4, to scan photodetectors numbers 3–5 and receive inputs therefrom, as is indicated by row (C3) on FIG. 4. Similarly, microprocessor 90 will simultaneously open switch number 5 in second switch array 82 and close switch number 6 to receive bar code data therethrough, as is indicated by row (C4) on FIG. 4.

Thus, by tracking the position of the edge of travelers check 20, apparatus 30 can read bar code 22, regardless of the skewing of the travelers check with respect to the apparatus.

Figure 5:
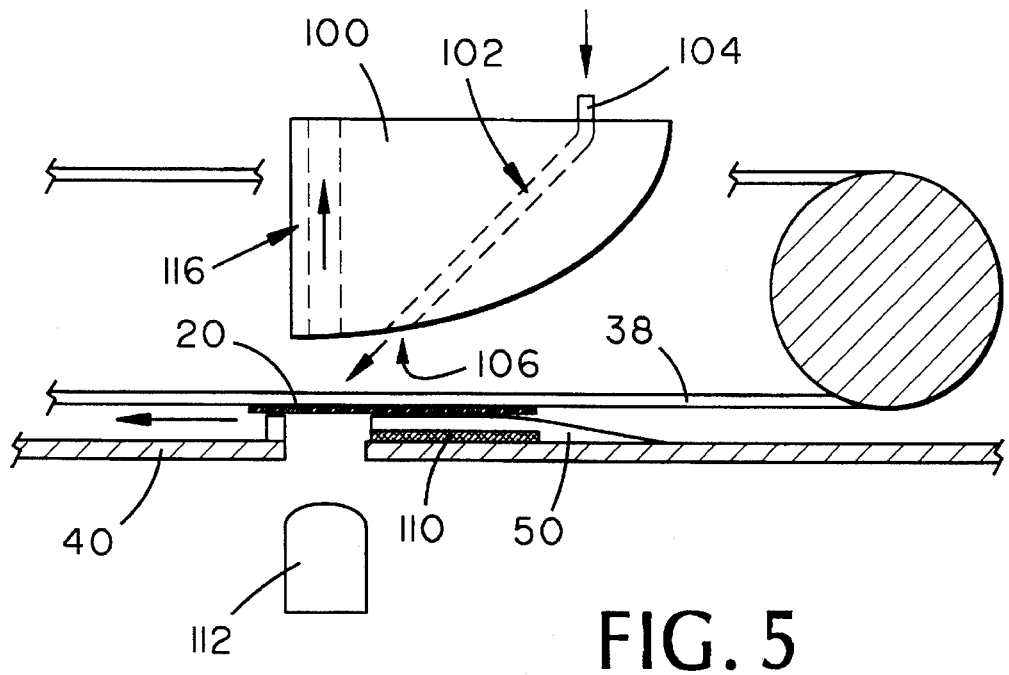
FIG. 5 is a fragmentary, side elevational view, partially in cross-section, of means to prevent fluttering of a travelers check as it is read by the apparatus of FIG. 2, including alternative backlighting means.

FIG. 5 illustrates a feature of the present invention which eliminates or minimizes the effect of, fluttering of the end of travelers check 20 as bar code 22 is being read. Since the travelers check 20 is relatively thin and the end with bar code 22 thereon is not fully supported top and bottom, there is a tendency for at least that end of the travelers check to flutter which affects the sensing of the edge thereof and the reading of the bar code. Accordingly, there may be disposed over base member 50 a block 100 having defined therethrough a channel 102 extending between an inlet fitting 104 and an outlet 106. An air supply (not shown) is connected to inlet fitting 104 and pressurized air is introduced into the channel and is discharged from output 106 in such manner as to force travelers check 20 against glass 58 (FIGS. 2 and 3) in the upper surface of base member 50. This maintains travelers check 20 flat and orthogonal with respect to the final light path and prevents or minimizes fluttering thereof.

It can be seen on FIG. 5 that base member 50 has a tapered forward edge so that the end of travelers check 20 bearing bar code 22 will be lifted off platen 40 and pass over the base member.

FIG. 5 also illustrates another feature of the present invention, that being an adhesive pad 110 disposed in a recess in the bottom of base member 50 to affix the base member to platen 40. Thus, apparatus 30 may be installed in ATM 32 by simply attaching upper support member 62 (FIG. 2) to surface 60 by any suitable conventional means, such as with a similar adhesive pad (not shown), and simply adhering base member 50 to platen 40.

FIG. 5 illustrates yet another feature of the present invention, that being an alternative embodiment for providing backlighting of travelers check 20. As noted above, the optical path for light from light source 74 shown on FIG. 2 was chosen because of considerations in retrofitting apparatus 30 to existing ATMs and the arrangement shown on FIG. 2 is employed to avoid having to cut through platen 40. However, where this is not a consideration, a light source 112 may be disposed below an opening 114 defined in platen 40 to illuminate the lower surface of travelers check 20. Light passing through (or around) travelers check 20 can then be detected as indicated on FIGS. 2 and 3 and, if block 100 is provided (FIG. 5), it will have a channel 116 defined therethrough for the passage of light to the photodetecting apparatus (not shown on FIG. 5).

Figure 6:
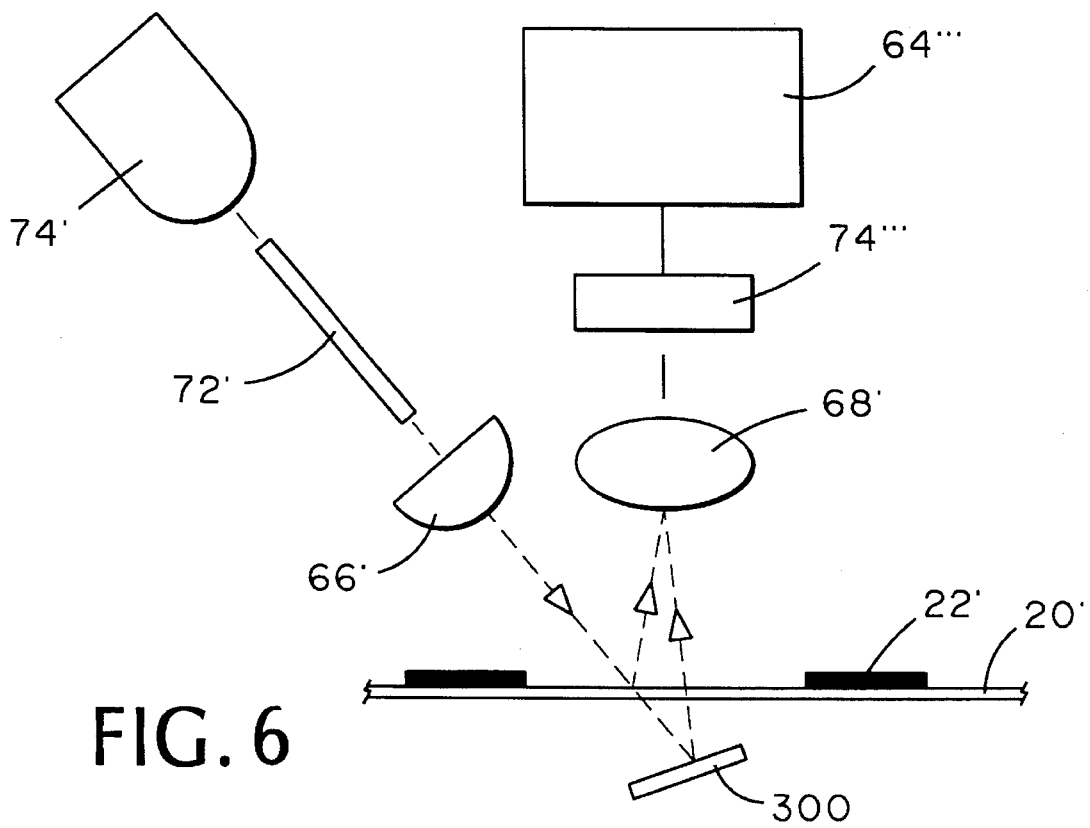
FIG. 6 is a fragmentary, schematic, side elevational view of an alternative embodiment of the present invention.

While the embodiment of the present invention shown on FIGS. 1–5 has been described with reference to reading a bar code by passing a light beam through a substrate, the embodiment is also applicable to the reading of a more conventional bar code by means of reflected light and FIG. 6 illustrates such an arrangement. A substrate, which may be a travelers check 20', having a conventional bar code 22' disposed thereon, is shown as being illuminated by light beams from a light source 74', the light beams having passed through fiber optic bundle 72' and a first lens 66'. Light reflected from travelers check 20' passes through a second lens 68' and is received by a linear photodetector array 70' connected to circuitry 64'. All the foregoing elements are similar in structure and function to the like elements on FIGS. 1–5.

A mirror 300 is disposed beneath travelers check 20' such that light from first lens 66' that passes the edge of the travelers check will be reflected from the mirror to second lens 68'. Thus, with the addition of mirror 300 to the rest of the elements common to apparatus 30 (FIG. 2), conventional bar codes may be read employing the edge sensing technique described above with respect to FIGS. 2–4.

The elements of apparatus 30 may be constructed of any suitable conventional materials and commercially available components by conventional means and techniques.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A reader for reading indicia disposed on a substrate moving relative to said reader, said indicia being parallel to and at a known fixed distance from an edge of said substrate, said reader comprising:

(a) reading means for reading said indicia as said indicia normally move relative to said reading means along a fixed plane which passes through said reading means;

(b) optical sensing means for continuously sensing the position of said edge relative to said reading means while said indicia are being read; and (c) adjusting means responsive to said optical sensing means for adjusting said reading means such that said reading means can read said indicia when said edge is skewed with respect to said reading means such that said indicia no longer move along said plane;

said reading means and said optical means including:

(d) a linear array of photodetector elements disposed on a line passing through plane and over said edge;

(e) said photodetector elements to detect said edge of said substrate by comparing contrast between said substrate and a background; and (f) said reading means to use a selected one of said photodetector elements to read said indicia, said selected one of said photodetector element being said known fixed distance from a photodetector element detecting said edge of said substrate.

2. A method of reading indicia disposed on a substrate moving relative to reading means, said indicia being parallel to and at a known fixed distance from an edge of said substrate, and said indicia normally moving relative to said reading means along a fixed plane which passes through said reading means, said method comprising;

(a) continuously optically sensing the position of said edge relative to said reading means while said indicia are being read; and (b) in response to said optically sensing said position of said edge, adjusting said reading means such that said readingmeans can read said indicia when said edged is skewed with respect to said reading means such that said indicia no longer move along said plane;

the method further including:

(c) providing a path of light to a linear array of photodetector elements such that said path of light will be partially broken at said edge of said substrate;

(d) determining along said linear array where said path of light is broken at said edge; and (e) using a selected one of said photodetector elements to read said indicia, said selected one of said photodetector elements being said fixed known distance from a photodetector detector element detecting said edge of said substrate.

3. A reader for reading a bar code disposed on a travelers check being dispensed by an automatic teller machine (ATM), said ATM having a housing and at least one continuous belt to which said travelers check is loosely adhered as said travelers check is moved by said belt over a platen, said bar code being printed parallel to an edge of said travelers check at a known distance therefrom, said reader comprising:

(a) a linear photodetector array disposed in said housing in a plane parallel to the movement of said travelers check, with the axis of said photodetector array orthogonal to the normal direction of motion of said travelers check, and disposed such that said edge and said bar code will pass thereunder in reading relationship thereto as said travelers check is moved by said belt, said edge and said bar code normally moving relative to said reading means along fixed planes which pass through said photodetector array;

(b) control means connected to said photodetector array to detect the position of said edge and to select a photodetector of said array with which to read said bar code, said control means further to adjust the selection of said a photodetector with which to read said bar code when said edge is detected as being skewed with respect to said linear array such that said bar code no longer moves along a said fixed plane; and (c) a light source to provide a path of light which is partially broken by said travelers check as said travelers check passes under said photodetector.

4. A reader, as defined in claim 3, further comprising a base member affixed to said platen over which said base member said travelers check passes as said bar code is read.

5. A reader, as defined in claim 4, further comprising means to direct a stream of gas at the top of said travelers check in the area of said bar code so as to force said travelers check against the upper surface of said base member and maintain said travelers check at a constant distance from said photodetector array.

6. A reader, as defined in claim 3, wherein said light path is reflected from a mirror disposed in said base member.

7. A reader, as defined in claim 3, wherein said light path originates from a lamp disposed beneath said platen.

8. A reader, as defined in claim 3, wherein said bar code is of the low visibility type.

9. A reader, as defined in claim 3, wherein said bar code is of the type having areas of less and more reflectivity and said apparatus further comprises:

(a) a light source disposed above said travelers check to provide said light path directed toward said travelers check so that said less and more reflected areas will be detected by the reflection of a first portion of said light path from said bar code; and (b) a mirror disposed below said edge of said travelers check so as to reflect to said photodetector array a second portion of said light path which falls outside said edge.

10. A method of reading a bar code disposed on a travelers check being dispensed by an automatic teller machine (ATM), said ATM having a housing and at least one continuous belt to which said travelers check is loosely adhered as said travelers check is moved by said belt over a platen, said bar code being printed parallel to an edge of said travelers check at a known distance therefrom, said method comprising:

(a) providing a linear photodetector array disposed in said housing in a plane parallel to the movement of said travelers check, with the axis of said photodetector array orthogonal to the normal direction of motion of said travelers check, and disposed such that said edge and said bar code will pass thereunder in reading relationship thereto as said travelers check is moved by said belt, said edge and said bar code normally moving relative to said reading means along fixed planes which pass through said photodetector array;

(b) detecting the position of said edge and selecting a photodetector of said array with which to read said bar code, and to adjusting the selection of said a photodetector with which to read said bar code when said edge is detected as being skewed with respect to said linear array such that said bar code no longer moves along a said fixed plane; and (c) providing a path of light which is partially broken by said travelers check as said travelers check passes under said photodetector.

11. A method, as defined in claim 10, further comprising a base member affixed to said platen over which said base member said travelers check passes as said bar code is read.

12. A method, as defined in claim 11, further comprising means to direct a stream of gas at the top of said travelers check in the area of said bar code so as to force said travelers check against the upper surface of said base member and maintain said travelers check at a constant distance from said photodetector array.

13. A method, as defined in claim 11, further comprising reflecting said light path from a mirror disposed in said base member.

14. A method, as defined in claim 10, further comprising originating said light path from a lamp disposed beneath said platen.

15. A method, as defined in claim 10, further comprising providing said bar code of the low visibility type.

16. A method, as defined in claim 10, further comprising providing said bar code of the type having areas of less and more reflectivity and said method further comprises:

(a) directing said light path from above said travelers check toward said travelers check so that said less and more reflected areas will be detected by the reflection of a first portion of said light path from said bar code; and (b) reflecting from below said edge of said travelers check a second portion of said light path which falls outside said edge.

* * * * *

UNITED STATES PATENT AND TRADEMARK OFFICE
CERTIFICATE OF CORRECTION

PATENT NO. : 5,550,929
DATED : August 27, 1996
INVENTOR(S) : James S. Bianco

It is certified that error appears in the above-indentified patent and that said Letters Patent is hereby corrected as shown below:

At column 7, line 23, ---said--- is inserted before "plane".

At column 7, line 43, "edged" is cancelled and ---edge--- is inserted therefor.

Col. 7, line 43, "readingmeans" should read --reading means--.

Signed and Sealed this

Twenty-ninth Day of October 1996

Attest:

BRUCE LEHMAN

*Attesting Officer*     *Commissioner of Patents and Trademarks*